United States Patent

McLaughlin et al.

[11] Patent Number: 5,795,285
[45] Date of Patent: Aug. 18, 1998

[54] CONVERSION OF CONTAMINATED SEDIMENTS INTO USEFUL PRODUCTS BY PLASMA MELTING

[76] Inventors: David Francis McLaughlin, 1537 Oak St., Oakmont, Pa. 15139; Nancy Hamp Ulerich, 57 Mallard Dr., Pittsburgh, Pa. 15238

[21] Appl. No.: 734,660

[22] Filed: Oct. 21, 1996

Related U.S. Application Data

[63] Continuation-in-part of Ser. No. 566,238, Dec. 1, 1995, Pat. No. 5,637,127.

[51] Int. Cl.⁶ .................. B09B 3/00; B09C 1/06; C03B 5/16
[52] U.S. Cl. .................. 588/256; 110/250; 210/768; 588/252; 588/900
[58] Field of Search .................. 588/11, 19, 227, 588/237, 252, 266, 257, 900; 65/134.8; 110/250; 210/768

[56] References Cited

U.S. PATENT DOCUMENTS

| | | | |
|---|---|---|---|
| Re. 35,219 | 4/1996 | Kent | 110/246 |
| 4,872,993 | 10/1989 | Harrison | 210/768 X |
| 4,922,841 | 5/1990 | Kent | 110/346 |
| 4,957,393 | 9/1990 | Buelt et al. | 405/128 |
| 4,986,197 | 1/1991 | Kent | 110/246 |
| 5,134,946 | 8/1992 | Poovey | 110/250 X |
| 5,476,994 | 12/1995 | Trezek | 588/256 |
| 5,516,975 | 5/1996 | Takazawa | 588/256 |
| 5,575,921 | 11/1996 | Askin et al. | 210/968 X |
| 5,611,766 | 3/1997 | Carle et al. | 588/252 |
| 5,626,249 | 5/1997 | Tylko | 588/900 X |
| 5,637,127 | 6/1997 | McLaughlin et al. | 65/134.8 |
| 5,656,009 | 8/1997 | Feng et al. | 588/11 |
| 5,666,891 | 9/1997 | Titus et al. | 110/250 |

Primary Examiner—George A. Suchfield

[57] ABSTRACT

A system for treating contaminated sediments dredged from waterways is disclosed. Dredged sediments are divided into coarse and fine fractions. The coarse fraction is washed to remove contaminants. The fine fraction and the contaminants removed from the coarse fraction are admixed, followed by filtering to produce a dewatered fraction. The dewatered fraction is then melted in a plasma melter to form a molten mass of glass or slag. The molten mass is then cooled to form a stable, low-leachability product. During the plasma melting operation, organic contaminants are destroyed and contaminants such as heavy metals are contained within the matrix of the melted glass or slag. After cooling the melted material may be provided in the form of aggregate, granules or fibers useful for various applications such as road fill, roofing granules and rock wool.

32 Claims, 3 Drawing Sheets

CONVERSION OF CONTAMINATED SEDIMENTS INTO USEFUL PRODUCTS BY PLASMA MELTING

CROSS-REFERENCE TO RELATED APPLICATION

This application is a continuation-in-part of application Ser. No 08/566,238 filed Dec. 1, 1995, now U.S. Pat. No. 5,637,127.

BACKGROUND OF THE INVENTION

1. Field of the Invention

The present invention relates to the treatment of contaminated sediments, and more particularly relates to a method and apparatus for plasma melting dredged sediments to destroy hazardous organics and convert contaminated particles into a low-leachability glass product.

2. Background Information

Sediments dredged from waterways and harbors commonly have organic and metal contamination accumulating from long term buildup of sewage and industrial effluents and rainwater washings. The contamination levels of certain contaminants in the New York/New Jersey Harbor, for example, are beyond the limits allowed for ocean disposal options of the dredged sediments. Sediments in the Great Lakes with point source contamination provide additional environmental cleanup challenges. Bay areas surrounding metropolitan areas are often shallow. They accumulate river-transported sediments and solids from both surface point and nonpoint sources. For example, sediments from the New York/New Jersey Harbor must be routinely dredged to maintain navigable water depths. Without dredging, the main channel depth of the Harbor would likely be less than 20 feet, whereas water depths of 45 feet are required to maintain safe navigability for large cargo ships. The annual volume of dredged Harbor sediments between 1970 and 1991 was over 8 million cubic yards (cy) per year.

Inexpensive ocean disposal has been the primary method for disposal of dredged sediments. The Marine Protection, Research and Sanctuaries Act, part of the Clean Water Act, requires that ocean dumping be evaluated by the EPA. Accordingly, the EPA has established criteria for ocean dumping established in the "Green Book", *Evaluation of Dredged Material Proposed for Ocean Dumping* (EPA, USAGE, 1991). The required sediment testing involves short term toxicity tests and longer term bioaccumulation tests.

Sediments that accumulate in waterways and harbors may contain contaminants such as organic compounds and heavy metals, frequently at high enough concentrations to prohibit direct ocean disposal or beneficial use without treatment. The criteria currently limit disposal of dredged material that either contain detectable (1 ppt) levels of selected dioxins, or that result in dioxin bioaccumulation at a 1 ppt level during 28 day tests. Specific sediment contaminant level and biological testing criteria are being developed for other target toxic substances, e.g., Hg and Pb. Ocean disposal restrictions such as limits on dioxin levels have prohibited the ocean disposal of large volumes of the dredged sediments. The regulations also prohibit the sediments from being ocean dumped and then capped.

Sediments are typically not considered to be RCRA materials, i.e., materials categorized as hazardous under the Resource Conservation and Recovery Act. It is unlikely that the vast majority of dredged sediments will leach harmful levels of metal or organics as defined under RCRA. The sediments are also typically not TSCA materials, i.e., materials controlled as toxic substances under the Toxic Substances Control Act. They typically contain about 1 ppm total polychlorinated byphenyls (PCB's), well below the 50 ppm target level for PCB that categorizes materials as toxic under TSCA. In order to allow ocean disposal, however, the sediments must pass the Green Book's rigorous biological effects testing.

There is therefore currently a need for either disposing of dredged sediments in upland facilities or decontaminating dredged sediments that are deemed unqualified for ocean disposal. Preferred solutions are decontamination processes that can produce useful, environmentally benign materials from the sediments, rather than only decontaminating sediments to allow ocean disposal.

One disposal option is to contain the sediment in a confined disposal facility (CDF). CDF's can be located upland above the water table, partially inland adjacent to the shore, or completely surrounded by water on an offshore island. In many metropolitan areas, upland and shoreland CDF's are not feasible because of scarcity and high cost of suitable land. Material handling, dewatering and transportation costs make remote upland sites expensive.

Containment islands have been proposed to serve as regional disposal facilities. The islands would be capped after completion. If the islands have acceptable ecological impact, they represent a feasible, relatively low-cost option for sediment disposal. Contained disposal may, however, require immobilization of the contaminants present in the sediments, particularly PCB's and dioxins. Immobilization can increase the disposal cost significantly.

Sediments may also be treated by removing or destroying the contaminants in order to allow disposal. Possible treatment options include bioremediation, dechlorination, thermal desorption, solidification, incineration and solvent extraction. However, processing costs for such treatments considered as potentially viable are very high.

Another option is to treat the sediments, by removing or destroying the contaminants while producing a useful product. Treatment methods that convert the sediments into a useful end-product, rather than merely decontaminating the sediments, can solve the decontamination problem, minimize the impact on the marine environment, and provide resale value to offset the expense of decontamination.

The present invention has been developed in view of the foregoing and to address other deficiencies of the prior art.

SUMMARY OF THE INVENTION

The integrated plasma processing system of the present invention for sediment decontamination provides an economical solution to the sediment decontamination problem. The process converts sediment waste into a useful material e.g., construction aggregate, roofing granules, or glass fiber products such as rock wool insulation. The process eliminates the need for disposal and containment of dredged waste, and operates in an environmentally sound manner.

The present system provides a high-throughput process for converting hazardous solid and liquid feed materials into stable, low-leachability glasses which are suitable for subsequent use. In accordance with the present invention, the as dredged sediment is screened to remove large particles with minimal contamination, partially dewatered, and then vitrified with a plasma melter to destroy the hazardous organics and convert the contaminated fines to a low-leachability glass product suitable for reuse as construction aggregate, roofing granules, glass fiber insulation or the like. The remaining streams leaving the system are non-hazardous discharge water, a small calcium sulfate stream from offgas sulfur removal and a clean offgas stream. The process is energy efficient, readily scalable to the desired production capacity, and has minimal secondary environmental impacts. In addition, the process preferably produces an end product material which is reusable, rather than a waste stream.

An object of the present invention is to provide a method of treating contaminated sediment including the steps of providing a source of contaminated sediment, separating the contaminated sediment into a coarse fraction and a fine fraction, washing the coarse fraction to produce a clean coarse fraction and a rinse water fraction comprising fines, filtering the fine fraction and the rinse water fraction to produce a dewatered fraction, melting the dewatered fraction in a plasma melter to form a molten mass, and cooling the molten mass to form a product.

Another object of the present invention is to provide an apparatus for treating contaminated sediment including a separator for dividing the contaminated sediment into a coarse fraction and a fine fraction, a washer for cleaning the coarse fraction to produce a clean coarse fraction and a rinse water fraction comprising fines, a filter for removing water from the fine fraction and the rinse water fraction to produce a dewatered fraction, and a plasma melter for melting the dewatered fraction to form a molten mass.

These and other objects of the present invention will become apparent from the following description.

DESCRIPTION OF THE PREFERRED EMBODIMENTS

Figure 1:
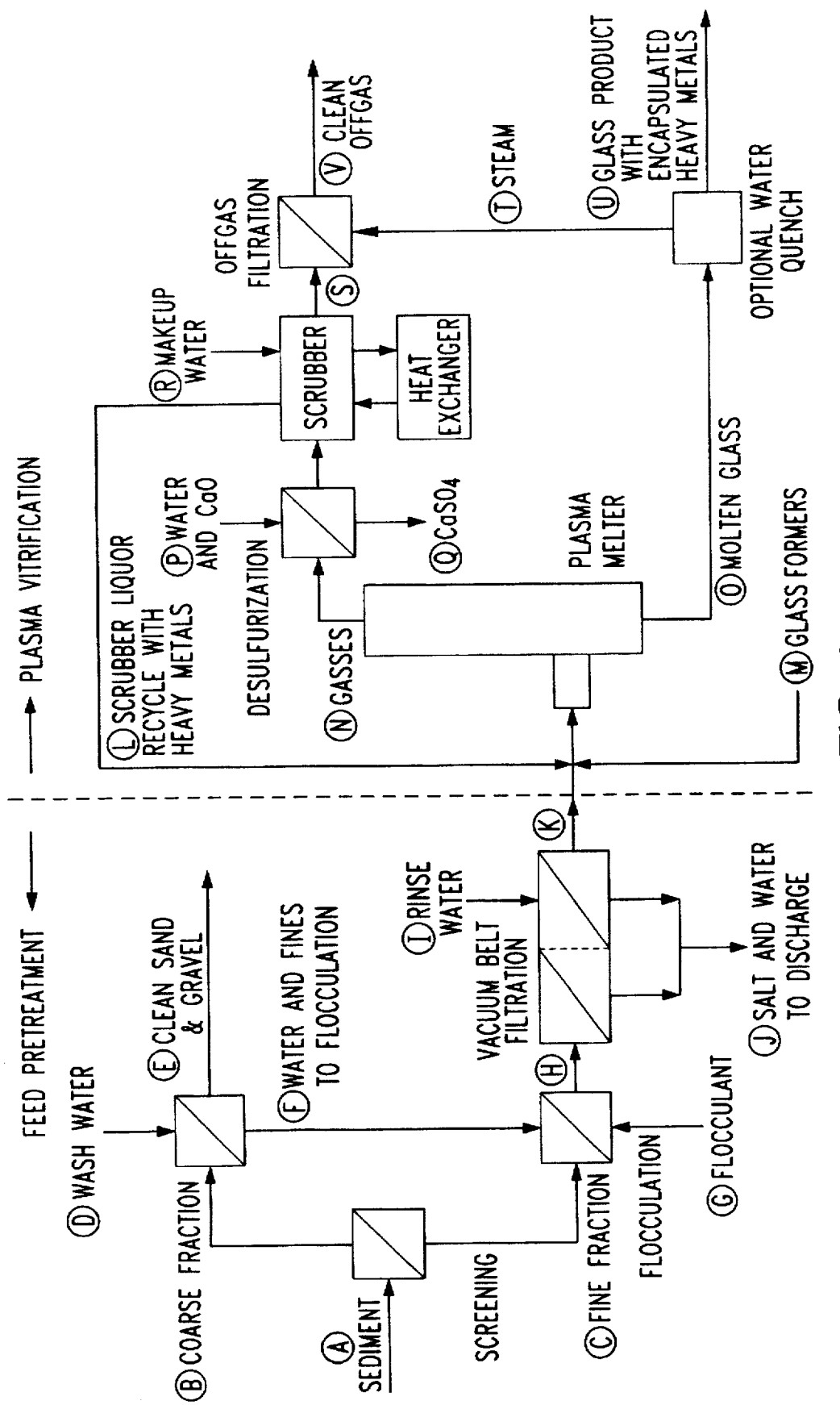
FIG. 1 is a schematic flowsheet showing a preferred plasma vitrification process of the present invention.

FIG. 1 is a schematic flowsheet showing a preferred plasma vitrification process of the present invention. Incoming sediment, such as sediment dredged from a waterway, is first screened to remove particles larger than about 200 μm, thereby producing a coarse fraction and a fine fraction. The particles of the coarse fraction can be easily and inexpensively washed free of contaminants. Washing may typically be carried out simultaneously with screening by adding wash water to the as-dredged material on the screen and using it to transport the fines fraction through the screen. Fines and wash water from the coarse fraction may then be blended with an optional flocculating agent.

Although sediments may be directly fed to the plasma vitrification system, sediment pretreatment may substantially improve process effectiveness. Partial decontamination by separation of gravel from finer material may be performed as described above, and the coarse washed gravel fraction may be used directly as a component of the final aggregate if desired.

Following optional flocculation, the sediment is partially dewatered by processing with a high throughput vacuum belt filter, centrifuge, plate-and-frame filter or the like. First stage filtration by the filter system preferably dewaters the sediment to approximately 50–70 weight percent solids, removing roughly 75% of the dissolved salt from the sediment (initially for estuarine sediments containing about 2% NaCl). Depending on filter performance, a second filtration stage may be provided in which rinse water is initially added to further desalinate the mixture, yielding a dewatered fraction or feed stream that is dewatered to preferably 50–70% solids but now contains only about 0.25% NaCl. A removal of at least about 95% chloride may therefore be accomplished. For stabilization of estuarine and harbor sediments saturated with seawater, these pretreatment steps improve the process economics by reducing the volume of sediments that need to be processed, reducing the water content of the sediments, and partially removing sodium chloride prior to melting.

This dewatered fraction stream is then preferably blended with scrubber recycle water and injected into the melting duct or tuyere of a plasma melter with a feed pump. Here advantage is taken of the prior screening, wherein large particles which could interfere with feed pump operation have already been removed. On contact with the intense heat of the plasma plume, the dewatered sediment fraction is rapidly heated first to the point where the water content is flashed to steam, then to calcination temperatures, at which point glass former sodium and calcium carbonates are dissociated to form $Na_2O$ and CaO, and hydrated mineral species are reduced to anhydrous oxides, and finally to melting temperatures. Depending on the composition of the sediment, supplemental glass formers may be added prior to introduction into the plasma melter. Suitable supplemental glass formers include calcium-based, sodium-based, lithium-based, potassium-based, magnesium-based and boron-based materials. Lime, soda ash and calcium carbonate are particularly useful glass formers. A typical mixing temperature in the melting tuyere with pretreated sediment feed is over about 2100° C., preferably about 2200°–2500° C., whereas the highest melting species in the sediment (typically alumina) melts at only 2045° C. Rapid melting is enhanced by the small particle size of the sediment, and the vigorous mixing and intense thermal radiation in the tuyere.

The molten glass/slag mass collected from the tuyere is extracted via a bottom drain and collected. The flowsheet in FIG. 1 shows an optional direct water quenching step to form a granular aggregate. If manufacture of granules or rock wool are the desired final product, the molten material may flow from the plasma melter into a secondary glass tank heated by gas combustion torches, from which the granule or fiber formation process would take place.

Most of the components of the sediment are rapidly incorporated into the glassy melt. Some fraction of the more volatile heavy metals, e.g., Cd, Pb, Zn and Hg, will report to the offgas stream and leave the melter. This offgas may then be cleaned by partial quenching, lime injection to absorb sulfur dioxide, hot gas filtration to collect and remove calcium sulfate, high-efficiency liquid scrubbing to remove and collect heavy metals and nitrogen oxides, and finally low-temperature final filtration to eliminate entrained mist. The scrubber liquor may be circulated through a heat exchanger to remove excess heat, and makeup water may be continuously added to account for water stripped out by the hot offgases.

A fraction of the scrubber liquor may be continuously withdrawn and returned to the melting tuyere of the plasma melter. As the heavy metal concentrations build up in the scrubber, eventually each metal will attain a concentration such that the fractional retention in the glass multiplied by the concentration in the mixed feed-recycle stream is equal to the rate of addition of fresh sediment feed. At that point the net flow of the contaminant reaches steady state. To minimize the volume of effluent water which may require treatment, scrubber water recycle allows the contaminant concentrations to rise to steady state. For estuarine or marine sediment, the total volume of the recycle stream is typically dominated by sodium chloride, which is known to have a low glass retention, measured at approximately 10%. It is this retention efficiency which sets the volume of the recycle stream reported in the material balance.

Figure 2:
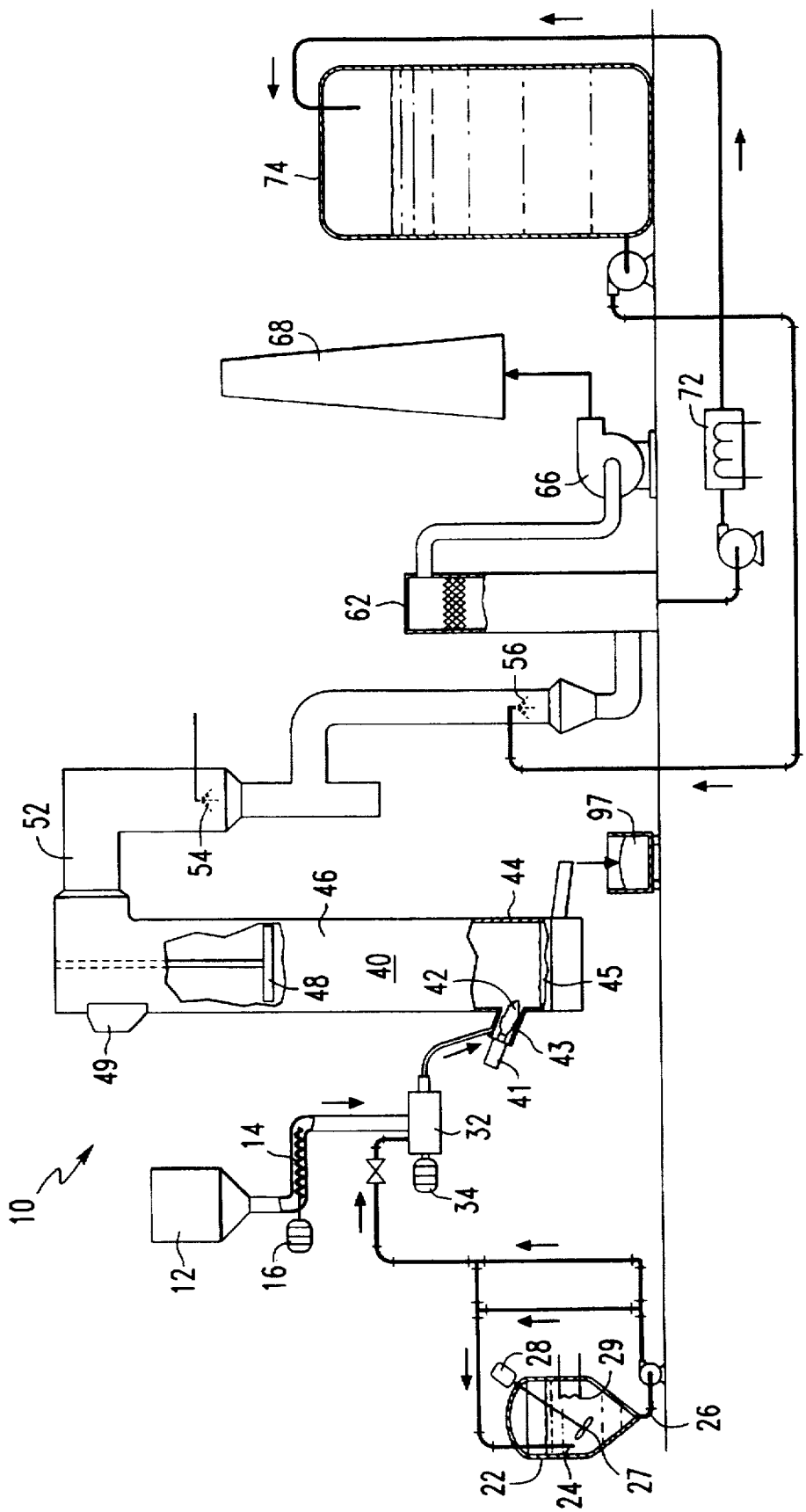
FIG. 2 is a partially schematic drawing showing various components of a plasma melting system in accordance with a preferred embodiment of the present invention.

FIG. 2 schematically illustrates the components of a plasma fired vitrification reactor system 10 in accordance with a preferred embodiment of the present invention. A hopper 12 is used to contain the fine fraction. A feed auger 14 driven by a motor 16 is used to transport the fine fraction to a feed pump 32. A feed tank 22 contains the pretreated finer fraction, which in this embodiment is slurried with additional water for ease of feed injection. The feed tank 22 includes an inlet pipe 24 and an outlet pipe 26. A stirrer 27 is driven by a motor 28. A the fraction of the flow in outlet pipe 26 is returned to the feed tank to assist the stirrer 27 in maintaining a homogeneous mixture. A heating element 29 is also provided for cold weather operation to prevent freezing. The fraction exiting the feed tank 22 is pumped to the feed pump 32, which is driven by a motor 34. The feed pump 32 provides the pressure to transport the feed slurry to a plasma melter 40.

The plasma melter 40 includes a plasma torch 41 which generates a plasma plume 42. The plasma torch 41 is mounted adjacent a tuyere 43. The plasma melter 40 includes a crucible 44 which is used to contain the molten mass 45 generated by the plasma torch 41. In the preferred embodiment, the plasma melter comprises a substantially vertical melter shaft 46. The shaft 46 is preferably lined with a high-alumina refractory material which possesses good resistance to vitreous slag materials. A radiation baffle 48 designed to reduce radiative heat losses is mounted inside the melter shaft 46. A charge door 49 located near the top of the melter shaft 46 allows access to the interior of the shaft. A horizontal duct 52 located at the top of the melter shaft 46 transports process gases past a pre-quench spray nozzle 54. The gases then travel past a venturi scrubber 56. A demister/separator 62 is used to collect liquid droplets exiting the scrubber and prevent excessive loading of the exhaust blower 66, as well as preventing discharge of contaminated liquid. The exhaust blower 66 forces exhaust gases through the stack 68, and maintains a negative pressure in the entire melter system. The liquid fraction exiting the demister/separator 62 is pumped through a heat exchanger 72 and into a scrubber tank 74. The liquid in the scrubber tank 74 is pumped to the venturi scrubber 56.

Figure 3:
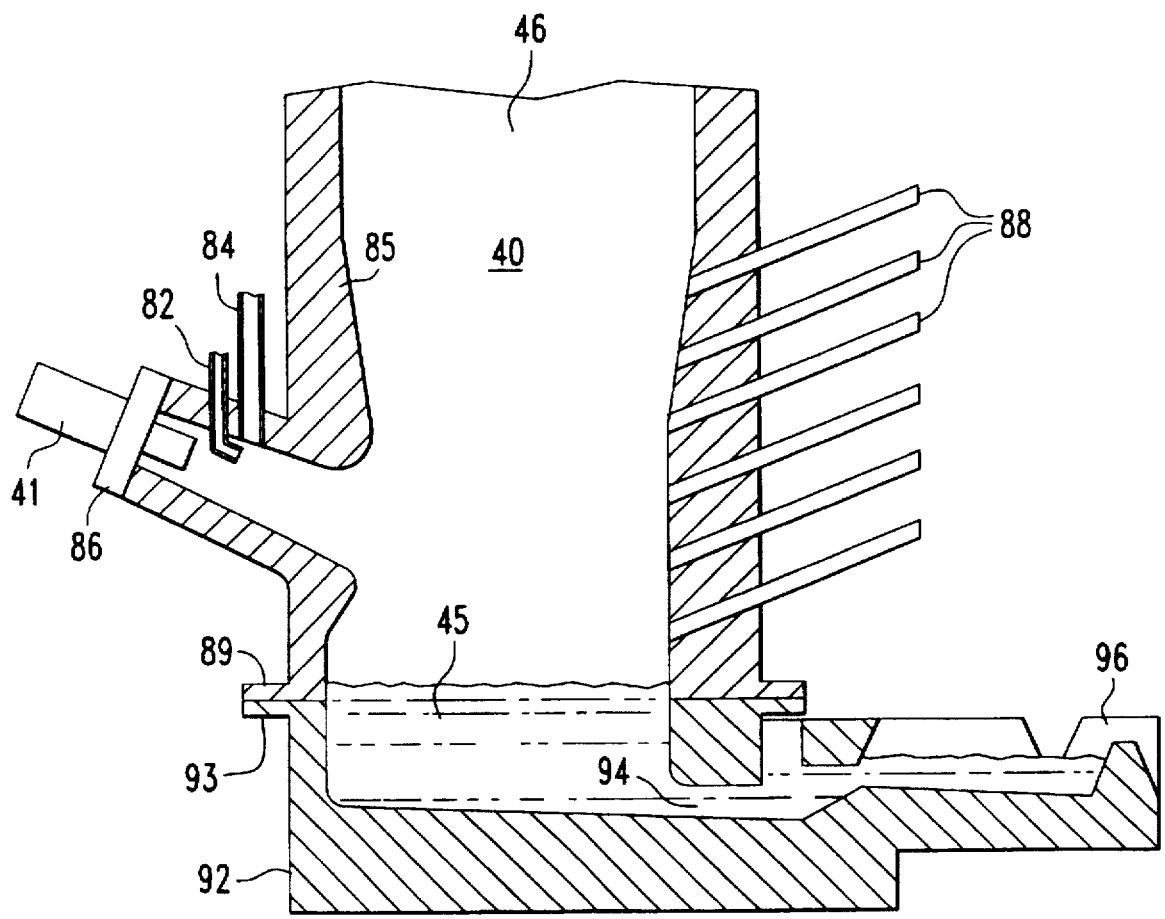
FIG. 3 is a partially schematic drawing of a plasma melter in accordance with a preferred embodiment of the present invention.

As shown in FIG. 3, the plasma melter 40 includes a refractory lining 85 made of any suitable material such as alumina, chromia or alumina-silica. A slurry injection port 82 and solids feed port 84 extend through the refractory lining 85 adjacent the plasma torch 41. A flange 86 is used to secure the plasma torch 41 to the refractory lining 85. View ports 88 extending through the refractory lining 85 are used to view the interior of the plasma melter 40 during the melting process. A flange 89 at the bottom of the melter is used to secure a crucible 92 to the melter shaft 46. The crucible 92 includes a flange 93 in contact with the flange 89 of the refractory lining 85. The flanges 89 and 93 are secured together by any suitable means such as steel bolts. A tap hole 94 extends through the bottom portion 92 into a spout 96. The spout 96 transports the molten mass 45 to, for example, a steel mold box 97, as shown in FIG. 2.

During operations the vitrified product may be collected in steel mold boxes, supported by sand-lined steel containers mounted on rails for easy removal from the plasma melter. Alternatively, the molten product may be directly quenched into water to shatter the glassy slag into aggregate, granulated in a controlled manner to produce uniform roofing granules, or centrifugally thrown into glass fibers for rock wool fabrication.

As shown in FIG. 3, process heat is preferably supplied by a commercially available non-transferred arc plasma torch 41, mounted to one side of the crucible zone in a tuyere 43. A production scale Westinghouse Marc-11 Plasma Torch may be used to supply the thermal energy to the plasma melter. The torch is rated at 2300 kW input electrical power, with an overall torch-and-tuyere electrical to thermal efficiency of between 80 to 90%. The torch design utilizes a pair of cylindrical, water cooled electrodes to generate a DC arc, which is rotated by an electric field. Process gas is injected through the cylindrical electrode gap at typical flowrates of 100 to 150 scfmn. The high velocity of the gas carries the arc into the throat of the torch, and heats the working gas to extremely high temperatures. Field coils rotate the electrically conductive plasma at high rotational velocities, such that the point of contract of the arc with the downstream electrode is constantly moving. This feature minimizes ablation of the electrode, and leads to extended electrode lifetimes. The superheated process gas is mixed with additional gas at the torch nozzle. This shroud gas flow blankets the superheated plasma plume and extends the life of the tuyere refractory.

The non-transferred arc plasma torch 41 is preferably able to decouple and independently control the gas temperature and chemistry. The torch 41 is capable of operating on air (the most common choice due to economic considerations and the gas recommended for us in harbor sediment stabilization), nitrogen (if oxidizing conditions are to be avoided), hydrogen (providing a reducing chemistry), or inert gases such as helium or argon (suppressing arc chemistry).

Material balance calculations are provided in Tables 1 and 2. Material balances are computed for the production-scale operation of 100,000 yd$^3$/yr (assumed to be 100,000 ton/yr) of harbor sediment. Stream numbers are shown with reference to the circled letters in FIG. 1. The feed A is separated in coarse and fine fractions B and C, with 12% assumed to be oversize. The coarse material is washed, and the combined feed filtered and dewatered, resulting in a 60% decrease in mass relative to as-dredged sediment. Sodium and calcium carbonates are then added, assumed to represent 15% of the final glass. The final yield is 270 kg of glass aggregate per metric tonne of feed sediment. The calcium sulfate from the desulfurizer represents the only significant solid waste stream (14 kg per metric tonne of sediment).

TABLE 1

Material Balance for Sediment Pretreatment

| Stream ID | A Feed | B Coarse Fraction | C Fine Fraction | D Wash Water | E Clean Sand and Gravel | F Wash Liquor | G Flocculant Feed | H Flocculated Fines | I Rinse Water | J Water to Discharge | K Feed to Melter | L Scrubber Recycle |
|---|---|---|---|---|---|---|---|---|---|---|---|---|
| Stream T, Deg. F. | 70 | 70 | 70 | 70 | 70 | 70 | 70 | 70 | 70 | 70 | 70 | 150 |
| Solids, lb/hr | | | | | | | | | | | | |
| Gravel | 1440.38 | 1440.38 | 0.00 | 0.00 | 1440.38 | 0.00 | 0.00 | 0.00 | 0.00 | 0.00 | 0.00 | 0.00 |
| Sand | 3436.03 | 171.77 | 3263.69 | 0.00 | 8.59 | 163.18 | 0.00 | 3426.88 | 0.00 | 0.00 | 3419.42 | 0.00 |
| Silt | 2154.30 | 107.72 | 2046.70 | 0.00 | 5.39 | 102.34 | 0.00 | 2149.04 | 0.00 | 0.00 | 2144.36 | 0.00 |
| Clay | 1319.30 | 65.99 | 1253.75 | 0.00 | 3.30 | 62.69 | 0.00 | 1316.44 | 0.00 | 0.00 | 1313.58 | 0.00 |
| Sulfur | 121.25 | 6.06 | 115.19 | 0.00 | 0.03 | 1.49 | 0.00 | 116.67 | 0.00 | 0.00 | 116.67 | 0.00 |
| Hy Metals | 15.03 | 0.75 | 14.28 | 0.00 | 0.04 | 0.71 | 0.00 | 14.99 | 0.00 | 0.00 | 14.99 | 0.00 |
| Subtotal Fluid, lb/hr | 8486.28 | 1792.67 | 6693.61 | 0.00 | 1457.72 | 330.41 | 0.00 | 7024.01 | 0.00 | 0.00 | 7009.02 | 0.00 |
| NaCl | 495.86 | 36.82 | 459.04 | | 30.05 | 80.41 | | 539.45 | | 513.88 | 25.57 | 69.72 |
| Water | 16032.89 | 1190.57 | 14842.32 | 9819.14 | 971.77 | 2599.95 | 689.24 | 18131.50 | 8595.72 | 23773.38 | 2953.86 | 2254.24 |
| Flocculant | | | | | | | 6.89 | 6.89 | 0.00 | 6.13 | 0.33 | 0.00 |
| Subtotal | 16528.75 | 1227.39 | 15301.36 | 9819.14 | 1001.82 | 2680.36 | 696.13 | 18677.84 | 85959.75 | 24293.39 | 2979.77 | 2323.96 |
| Total | 25015.03 | 3020.06 | 21994.97 | 9819.14 | 2459.54 | 3010.76 | 696.13 | 25701.86 | 8595.75 | 24293.39 | 9988.79 | 2324.71 |

TABLE 2

Material Balance for Sediment Vitrification

| Stream ID | K Feed To Melter | L Scrubber Recycle | M Glass-formers | N Melter Offgas | O Molten Glass | P Lime Spray | Q Sulfate To Disposal | R Makeup Water | S Scrubber Offgas | T Steam from Quench | U Aggregate | V Plant Offgas |
|---|---|---|---|---|---|---|---|---|---|---|---|---|
| Stream T, Deg. F. | 70 | 150 | 70 | 2100 | 2700 | 1800 | 300 | 70 | 170 | 250 | 70 | 190 |
| Solids, lb/hr | | | | | | | | | | | | |
| $SiO_2$ | 4812.30 | | | | 4812.30 | | | | | | 4812.30 | |
| MgO | 123.02 | | | | 123.02 | | | | | | 123.02 | |
| $(K,Na)_2O$ | 235.60 | | | | 235.60 | | | | | | 235.60 | |
| CaO | 33.08 | | | | 1017.83 | 146.92 | | | | | 1017.83 | |
| $Al_2O_3$ | 598.85 | | | | 598.85 | | | | | | 598.85 | |
| $CaCO_3$ | | | 1757.55 | | | | | | | | | |
| $CaSO_4$ | | | | | | | 356.67 | | | | | |
| Sulfur | 116.67 | | | | | | | | | | | |
| Hy Metals | 14.99 | 0.75 | | 0.37 | 14.99 | | | | | | | |
| Organics | 1074.52 | | | | | | | | | | 14.99 | |
| Subtotal Fluid, lb/hr | 7009.02 | 0.75 | 1757.55 | 0.37 | 6802.58 | 146.92 | 356.67 | | | | 6802.58 | |
| NaCl | 25.57 | 69.72 | | | | | | | | | | |
| Water | 2953.86 | 2254.24 | | | | | | | | | | |
| Floc | 0.33 | | | | | | | | | | | |
| Subtotal Gas, lb/hr | 2979.77 | 2323.96 | | | | | | | | | | |
| Ar | | | | 253.18 | | | | | 253.18 | | | 253.18 |
| $CO_2$ | | | | 2867.52 | | | | | 2867.52 | | | 2867.52 |
| $SO_2$ | | | | 116.67 | | | | | 11.67 | | | 11.67 |
| $O_2$ | | | | 2700.44 | | | | | 2700.44 | | | 2700.44 |
| $N_2$ | | | | 15056.03 | | | | | 15056.03 | | | 15056.03 |
| $H_2O$ | | | | 6506.80 | | | | | 8710.84 | | | 8710.84 |
| Subtotal | | | | 27500.65 | | | | | 29599.68 | | | 38915.81 |
| Total | 9988.79 | 2324.71 | 1757.55 | 27501.02 | 6802.58 | 587.70 | 356.67 | 5756.97 | 29599.68 | 9316.13 | 6802.58 | 38915.81 |

In accordance with the present invention, glass is preferably used for encapsulation and immobilization of heavy metals. A wide variety of metal oxides exhibit good solubility in glass and very low leachability from the final product. Table 3 presents a summary of toxic heavy metals of concern in the environment, and the result during high-temperature vitrification. Metals with high glass solubility may be effectively incorporated into the glass matrix and immobilized. If the metal oxide volatility is high, some fraction of the feed metal will report to the offgas stream and require recycle from the scrubber, but ultimately the metal will become encapsulated in the glass matrix. Certain metals with low glass solubility may still be incorporated effectively if the concentration is limited, including nickel and chromium. In all cases, the leachability of the heavy metal will be low.

TABLE 3

Retention of Some Heavy Metals During Vitrification

| Difficulty of Vitrification | Easy | Recycle Required | Very Difficult |
|---|---|---|---|
| Glass Solubility | High | Low | High | Low |
| Metal Oxide Volatility | Low | Low | High | High |
| Species | Fe, Sb, Cu, Sn, Mn, Zr, U, Ba, Sr | Ni, Cr, Ag | Cd, As, Pb, Zn, Bi, Mo, Cs, Tc | Hg, Se |

The few metals exhibiting both low glass solubility and high volatility, such as mercury, present the greatest challenge. The concentration will gradually increase in the scrubbing system liquor. If the retention efficiency is very low, the accumulation of Hg may be avoided by removing a bleed stream from the scrubber, and the small quantity of liquid discharged to maintain a steady state inventory of mercury in the system. If such a bleed stream is combined with the discharge water from dewatering and rinsing the incoming sediment, the concentration of mercury may be on the order of 1 ppm. Other heavy metals may also be present in this bleed stream, the concentration of which will depend on their individual retention efficiencies in the glass.

Alternatively, another approach is to avoid any bleed stream and carry out batch treatment of the scrubber liquor once the contaminant concentration has reached a specified level. At 100,000 yd³/yr throughput, mercury may accumulate at maximum rate of only about 200 lb/yr in the system, assuming the worst case of zero glass retention.

The intense heat of the plasma vitrification tuyere is capable of destroying even the most refractory organic species. Material balances on the total organic carbon (TOC) indicate at least 99.2% destruction efficiency, with analysis for TOC below the detection limit in the product. Thermal dissociation of complex toxic organics typically proceeds through smaller molecules (for example breakdown of EDTA into citrate and oxalate), so that any residual TOC is unlikely to represent the original toxic species.

Plasma pyrolysis of PCB-containing oils was tested. In these tests, 40,000 liters of various solvents and 4,700 liters of Askarel transformer fluid were processed in the plume of a plasma torch. Careful analysis of the offgas was carried out to ascertain the PCB destruction efficiency and to look for dioxin formation. In no case was a measurable quantity of dioxin found. PCB destruction efficiencies up to 99.9999998% were measured, as shown in Table 4.

TABLE 4

Results of Plasma Pyrolysis Testing of PCB Transformer Fluids

| Test Number | Run Time (minutes) at 1 gpm | Destruction Removal Efficiency (%)* |
|---|---|---|
| 1 | 60 | 99.999997 |
| 2 | 60 | 99.999994 |
| 3 | 60 | 99.99996 |
| 4 | 150 | 99.999998 |
| 5 | 300 | 99.9999998 |
| 6 | 300 | 99.9999998 |
| 7 | 300 | 99.999999 |

*DRE = 100 × [PCB(input) − PCB(output)]/PCB(input)

Because the resulting glassy product has low heavy metal leachability and extremely low organic content, it is suitable for subsequent use. Combined with the decontaminated gravel fraction, this material may be suitable for use as aggregate for construction block and roadbed material. Additives may also be provided to modify the color of the final glass. Furthermore, the particle size may be controlled more carefully than by a simple water quench by crushing, grinding and the like. A potential market for the resultant product is specialty decorative aggregate. Another potential market for sediment slag is the production of roofing granules, used as a barrier on asphalt roofs and shingles to protect the asphalt from ultraviolet degradation.

Depending on the actual chemical makeup of the final product, this material could be used as raw material for glass manufacture. For example, the composition of the sediment may be very similar to the commonly used "C-Glass" recipe for high-quality commercial fiberglass. The two materials are compared in Table 5. Because of the variability inherent in the harbor sludge, the feed chemistry may not be suitable for high-quality glass fiber. However, an attractive market is the production of rock wool. This material is typically made in large volumes by blowing fibers off of rotating wheels in large tanks of molten slag. The raw material for rock wool production has traditionally been steel mill slag, which is remelted with coke. Recently, this market has suffered from environmental regulation due to sulfur emissions inherent with both mill slag and coke. In contrast, the glass product from the present plasma melting process may be low in sulfur, usually less than about 0.2% sulfur and typically less than about 0.05% sulfur.

TABLE 5

Comparison of Sediment Glass to Commercial Fiberglass Composition

| Oxide Composition | Preliminary Sediment Glass | "C"-Glass for Fiberglass |
|---|---|---|
| $SiO_2$ | 62.2% | 65.0% |
| CaO | 15.0% | 14.0% |
| $Na_2O$ | 10.0% | 10.0% |
| $Al_2O_3$ | 7.5% | 4.0% |
| $K_2O$ | 3.0% | 1.0% |
| MgO | 1.9% | 3.0% |
| $B_2O_3$ | — | 4.0% |

While a particular embodiment of the present invention has been described, it is to be understood that many modifications, adaptations and changes may be made by those skilled in the art, and such modifications, adaptations and changes are within the scope of the present invention, as set forth in the following claims.

What is claimed is:

1. A method of treating contaminated sediment comprising:

providing a source of contaminated sediment;

melting the contaminated sediment in a tuyere of a plasma melter to form a molten mass and to vitrify the molten mass while the mass is in the tuyere; and cooling the molten mass to form a vitrified product.

2. The method of claim 1, further comprising:

separating the contaminated sediment into a coarse fraction and a fine fraction;

washing the coarse fraction to produce a clean coarse fraction and a rinse water fraction comprising fines;

filtering the fine fraction and the rinse water fraction to produce a dewatered fraction; and melting the dewatered fraction in the plasma melter to form the molten mass.

3. The method of claim 2, further comprising admixing the fine fraction and the rinse water fraction prior to filtering.

4. The method of claim 3, further comprising flocculating the fine fraction and rinse water fraction prior to filtering.

5. The method of claim 2, wherein the coarse fraction has a particle size of greater than about 200 microns.

6. The method of claim 5, wherein the fines of the rinse water fraction have a particle size of less than about 200 microns.

7. The method of claim 2, wherein the filtering of the fine fraction and the rinse water fraction comprises:

admixing the fine fraction and the rinse water fraction;

dewatering the mixture on a filter to about 50 to about 70 weight percent solids;

rinsing the solids; and dewatering the rinsed solids to about 50 to about 70 weight percent solids.

8. The method of claim 1, further comprising adding at least one supplemental glass former to the sediment prior to melting in the plasma melter.

9. The method of claim 8, wherein the at least one supplemental glass former comprises at least one material selected from the group consisting of lime, soda ash and calcium carbonate.

10. The method of claim 2, wherein the dewatered fraction is melted at a temperature of greater than about 2100° C.

11. The method of claim 2, wherein the dewatered fraction is melted at a temperature of from about 2200° to about 2500° C.

12. The method of claim 1, further comprising recovering gases generated by the plasma melter.

13. The method of claim 12, further comprising scrubbing the recovered gases to produce a scrubber liquor.

14. The method of claim 13, further comprising adding the scrubber liquor to the contaminated sediment prior to introduction into the plasma melter.

15. The method of claim 1, further comprising cooling the molten mass by quenching.

16. The method of claim 15, further comprising recovering gases generated during the quenching.

17. The method of claim 1, wherein the contaminated sediment is dredged from a waterway.

18. The method of claim 1, wherein the contaminated sediment comprises sand.

19. Apparatus for treating contaminated sediment comprising:

supply means for providing contaminated sediment;

plasma melter means for melting the contaminated sediment in a tuyere to form and vitrify a molten mass containing at least a portion of the contaminants of the sediment while the molten mass is in the tuyere; and cooling means for cooling the molten mass to form a vitrified product, form a molten mass containing at least a portion of the contaminants of the sediment.

20. The apparatus of claim 19, further comprising dewatering means for at least partially removing water from at least a portion of the contaminated sediment prior to melting the sediment.

21. The apparatus of claim 20, further comprising means for separating the contaminated sediments into a coarse fraction and a fine fraction prior to dewatering.

22. The apparatus of claim 21, further comprising means for washing the coarse fraction to produce a clean coarse fraction and a rinse water fraction, and means for delivering the rinse water fraction to the dewatering means.

23. The apparatus of claim 21, further comprising means for flocculating the fine fraction and rinse water fraction prior to dewatering.

24. The apparatus of claim 19, further comprising means for adding a supplemental glass former to the sediment prior to melting the sediment.

25. The apparatus of claim 19, further comprising means for recovering gases generated by the plasma melter means.

26. The apparatus of claim 25, further comprising means for scrubbing the recovered gases to produce a scrubber liquor and means for adding the scrubber liquor to the dewatered contaminated sediment prior to melting the dewatered contaminated sediment in the plasma melter means.

27. A product produced by the method of claim 1.

28. The product of claim 27, wherein the product comprises glass.

29. A method of treating contaminated sediment comprising:

providing a source of contaminated sediment comprising sand, silt and clay;

melting the contaminated sediment in a plasma melter to form a molten mass; and cooling the molten mass to form a glass product.

30. A method of treating contaminated sediment comprising:

providing a source of contaminated sediment;

melting the contaminated sediment in a plasma melter to form a molten mass; and cooling the molten mass to form a glass product comprising $SiO_2$, $CaO$ and $Na_2O$.

31. Apparatus for treating contaminated sediment comprising:

supply means for providing contaminated sediment comprising sand, silt and clay;

plasma melter means for melting the contaminated sediment to form a molten mass containing at least a portion of the contaminants of the sediment; and cooling means for cooling the molten mass to form a glass product.

32. Apparatus for treating contaminated sediment comprising:

supply means for providing contaminated sediment;

plasma melter means for melting the contaminated sediment to form a molten mass containing at least a portion of the contaminants of the sediment; and cooling means for cooling the molten mass to form a glass product comprising $SiO_2$, $CaO$ and $Na_2O$.

* * * * *